(12) United States Patent
Klopp et al.

(10) Patent No.: US 9,876,408 B2
(45) Date of Patent: Jan. 23, 2018

(54) ELECTRIC MACHINE, SEALING ASSEMBLY AND ASSOCIATED METHOD

(71) Applicant: Regal Beloit America, Inc., Beloit, WI (US)

(72) Inventors: Mark Lyon Klopp, Berne, IN (US); Zachary Joseph Stauffer, Fort Wayne, IN (US); Edward Lewis Drye, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 181 days.

(21) Appl. No.: 14/446,448

(22) Filed: Jul. 30, 2014

(65) Prior Publication Data

US 2016/0036285 A1 Feb. 4, 2016

(51) Int. Cl.
*H02K 5/10* (2006.01)
*F16B 43/00* (2006.01)

(52) U.S. Cl.
CPC ............. *H02K 5/10* (2013.01); *F16B 43/001* (2013.01)

(58) Field of Classification Search
CPC ..................................................... H02K 5/10
See application file for complete search history.

(56) References Cited

U.S. PATENT DOCUMENTS

| | | | | |
|---|---|---|---|---|
| 1,990,279 A * | 2/1935 | Schaffler-Glossl | ..... | F42D 1/045 310/88 |
| 2,116,708 A * | 5/1938 | Niekamp | ................ | E04G 21/08 310/81 |
| 3,484,934 A * | 12/1969 | Wightman | ............. | H02K 15/16 29/596 |
| 3,788,185 A * | 1/1974 | Gutshall | ................. | F16B 35/06 411/369 |
| 4,049,986 A * | 9/1977 | Kreuz | ..................... | G01P 1/026 310/68 B |
| 4,128,935 A * | 12/1978 | Czech | .................... | H02K 15/16 29/596 |
| 4,628,155 A * | 12/1986 | Robineau | ............. | G10K 11/025 181/159 |
| 4,661,041 A | 4/1987 | Hessler | | |
| 4,806,810 A * | 2/1989 | Hernden | ................ | F16J 15/106 277/637 |

(Continued)

FOREIGN PATENT DOCUMENTS

| | | |
|---|---|---|
| CN | 102646911 A | 8/2012 |
| GB | 884464 A | 12/1961 |

(Continued)

*Primary Examiner* — Dang Le
(74) *Attorney, Agent, or Firm* — John Wagley (57) ABSTRACT

An electric machine includes an electric machine having a housing defining a cavity in the housing. The housing has an internal wall of the housing defining an aperture extending from an exterior of the housing to the cavity. The machine also includes a stator secured to the housing and a rotor. The rotor is rotatably secured to the housing. The machine also includes a component positionable in the aperture and a sealing member. The sealing member is operably associated with the component. At least a portion of the sealing member is made of a conformable material and adapted for engagement with the housing. The internal wall of the housing is adapted to radially engage the conformable portion of the sealing member.

20 Claims, 10 Drawing Sheets

(56) References Cited

U.S. PATENT DOCUMENTS

| | | | |
|---|---|---|---|
| 4,952,831 A * | 8/1990 | Isozumi | F02N 11/00 |
| | | | 174/153 R |
| 5,165,834 A * | 11/1992 | Takenouchi | F16B 43/001 |
| | | | 277/651 |
| 5,872,414 A * | 2/1999 | Iijima | H02K 5/10 |
| | | | 310/43 |
| 6,092,812 A | 7/2000 | Ursel et al. | |
| 6,121,700 A * | 9/2000 | Yamaguchi | H02K 5/1675 |
| | | | 310/425 |
| 6,579,202 B2 | 6/2003 | El-Antably et al. | |
| 6,717,308 B2 | 4/2004 | Chen et al. | |
| 8,283,821 B2 * | 10/2012 | Ohashi | H02K 55/02 |
| | | | 310/71 |
| 8,497,435 B2 | 7/2013 | Nagata et al. | |
| 2011/0012451 A1 * | 1/2011 | Bitzer | H01R 13/5205 |
| | | | 310/71 |
| 2012/0242197 A1 | 6/2012 | Fischer et al. | |

FOREIGN PATENT DOCUMENTS

| | | |
|---|---|---|
| JP | 64040216 A | 2/1989 |
| JP | 2001186711 A | 7/2001 |
| JP | 2010031784 A | 2/2010 |
| JP | 05169990 B2 | 3/2013 |

* cited by examiner

ELECTRIC MACHINE, SEALING ASSEMBLY AND ASSOCIATED METHOD

BACKGROUND OF THE INVENTION

The embodiments described herein relate generally to an electric machine, and more specifically, to an electric machine with an external fastener sealed with respect to a housing.

An electric machine is typically in the form of an electric generator or an electric motor. The machine typically has a centrally located shaft that rotates relative to the machine. Electrical energy applied to coils within the machine initiates this relative motion which transfers the power to the shaft and, alternatively, mechanical energy from the relative motion of the generator excites electrical energy into the coils. For expediency, the machine will be described hereinafter as a motor. It should be appreciated that a machine may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil, An electric current is directed through the coils which induces a magnetic field. It is the magnetic field that initiates this relative motion which transfers the power to the shaft.

The electric machine typically includes a housing for containing and supporting the stator. To position the stator and other components within the housing, typically the housing includes a plurality of components that are connected by, for example, fasteners. When the electric machine is exposed to fluids, for example water, the fasteners may serve as leak paths through the housing, The present invention is directed to alleviate at least some of these problems with the prior art.

BRIEF DESCRIPTION OF THE INVENTION

According to an embodiment of the present invention, an electric machine is provided. The machine includes an electric machine having a housing defining a cavity in the housing. The housing has an internal wall of the housing defining an aperture extending from an exterior of the housing to the cavity. The machine also includes a stator secured to the housing and a rotor. The rotor is rotatably secured to the housing. The machine also includes a component positionable in the aperture and a sealing member. The sealing member is operably associated with the component. At least a portion of the sealing member is made of a conformable material and adapted for engagement with the housing. The internal wail of the housing is adapted to radially engage the conformable portion of the sealing member.

According to an aspect of the present invention, the electric machine may be provided wherein the conformable material is compressible.

According to an aspect of the present invention, the electric machine may be provided wherein the internal wall of the housing defines a first portion thereof adapted to he in close proximity to a portion of the component and wherein the internal wall of the housing defines a second portion thereof adapted to be in close proximity to a portion of the sealing member.

According to another aspect of the present invention, the electric machine may be provided wherein the first portion of the internal wall includes generally a cylindrical bore and wherein the second portion of the internal wall includes a counterbore.

According to another aspect of the present invention, the electric machine may be provided wherein the sealing member includes at least a portion thereof made of a low durometer material for engagement with the housing.

According to another aspect of the present invention, the electric machine may be provided wherein the sealing member includes at least a portion thereof made of a polymer for engagement with the housing.

According to another aspect of the present invention, the electric machine may be provided wherein the sealing member includes a washer and a seal. The washer is in juxtaposition with the seal.

According to another aspect of the present invention, the electric machine may be provided wherein the component includes a fastener.

According to another aspect of the present invention, the electric machine may be provided wherein the component includes a fastener having a transversely extending portion and a shank portion extending from the transversely extending portion . The sealing member includes a backing member and a seal. The backing member is in juxtaposition with the seal.

According to another aspect of the present invention, the electric machine may be provided wherein the internal wall of the housing, the component and the sealing member are adapted to provide a sealed position for the sealing member in which the sealing member is in sealed engagement with the internal wall of the housing.

According to an embodiment of the present invention, a sealing assembly is provided. The sealing assembly is adapted for use in an electric machine to seal a component defining a cavity in the component. The component has an internal wall of the component defining an aperture in the component extending from an exterior of the component to the cavity. The sealing assembly includes a fastener positionable in the aperture and a sealing member. The sealing member is operably associated with the fastener and has at least a portion of the sealing member made of a conformable material and adapted for engagement with the component. The internal wall of the component is adapted to radially engage the conformable portion of the sealing member.

According to an aspect of the present invention, the sealing assembly may be provided wherein the conformable material is compressible.

According to an aspect of the present invention, the sealing assembly may be provided wherein the internal wall of the component defines a first portion of the component adapted to be in close proximity to a portion of the fastener and wherein the internal wall of the housing defines a second portion of the component adapted to be in close proximity to a portion of the sealing member.

According to another aspect of the present invention, the sealing assembly may be provided wherein the first portion of the internal wall includes generally a cylindrical bore and wherein the second portion of the internal wall includes a counterbore.

According to another aspect of the present invention, the sealing assembly may be provided wherein the sealing member includes at least a portion thereof made of a low durometer material for engagement with the component.

According to another aspect of the present invention, the sealing assembly may be provided wherein the sealing member includes at least a portion of the sealing member made of a polymer for engagement with the component.

According to another aspect of the present invention, the sealing assembly may be provided such that the sealing member includes a washer and a seal. The washer may be in juxtaposition with the seal.

According to another aspect of the present invention, the sealing assembly may be provided wherein the fastener has a transversely extending portion in the form of a head and a shank extending from the head. The sealing member includes a washer and a seal, the washer in juxtaposition with the seal.

According to another aspect of the present invention, the sealing assembly may be provided wherein the internal wall of the component, the fastener and the sealing member are adapted to provide a sealed position for the sealing member in which the sealing member is in sealed engagement with the internal wall of the component.

According to another embodiment of the present invention, a method for sealing an aperture defined by an internal wall formed in a component of an electric machine and extending from an external surface thereof to an internal surface thereof is provided. The method includes the steps of providing a fastener postionable in the aperture of the electric machine and providing a sealing member having at least a portion thereof made of a conformable material and adapted for engagement with the component. The method further includes the steps of positioning the sealing member between the fastener and the component and radially engaging the conformable portion of the sealing member with the internal wall of the component.

According to another aspect of the present invention, the method may be provided wherein the providing a fastener step includes providing a fastener with a transversely extending portion in the form of a head and wherein the radially engaging step includes advancing the fastener in an axial direction and compressing the conformable portion of the sealing member in an axial direction.

According to another aspect of the present invention, the method may be provided wherein the providing a sealing member step included providing a sealing member having a washer and a seal, the washer in juxtaposition with the seal, wherein the providing a fastener step includes providing a fastener with a head, and wherein the internal wall formed in the component includes a cylindrical bore and a counterbore, the cylindrical bore in juxtaposition with the counterbore.

DETAILED DESCRIPTION OF THE INVENTION

The electric machine typically includes a housing for containing and supporting a stator which is excited by an electrical source that excites an electromagnetic field in coils in the stator. The coils interact with a rotor rotatably supported in the housing to provide the mechanical rotational energy for the electrical machine. To position the stator and other components within the housing, typically the housing includes a plurality of components that are connected by, for example, fasteners.

When the electric machine is exposed to fluids, for example water, the fasteners may serve as leak paths through the housing. Machine designs that attempt to seal these leak paths may not be effective and may be very expensive. Inexpensive and reliable sealing of the fasteners is desirable in the design and manufacture of such electric machines. The method, systems and apparatus described herein facilitate inexpensive and reliable sealing of the fasteners for an electric machine. Designs and methods are provided herein to facilitate inexpensive and reliable sealing of the fasteners for an electric machine.

Technical effects of the methods, systems, and apparatus described, herein include at least one of reduced cost, improved serviceability, improved performance and quality, and reduced labor costs.

Figure 1:
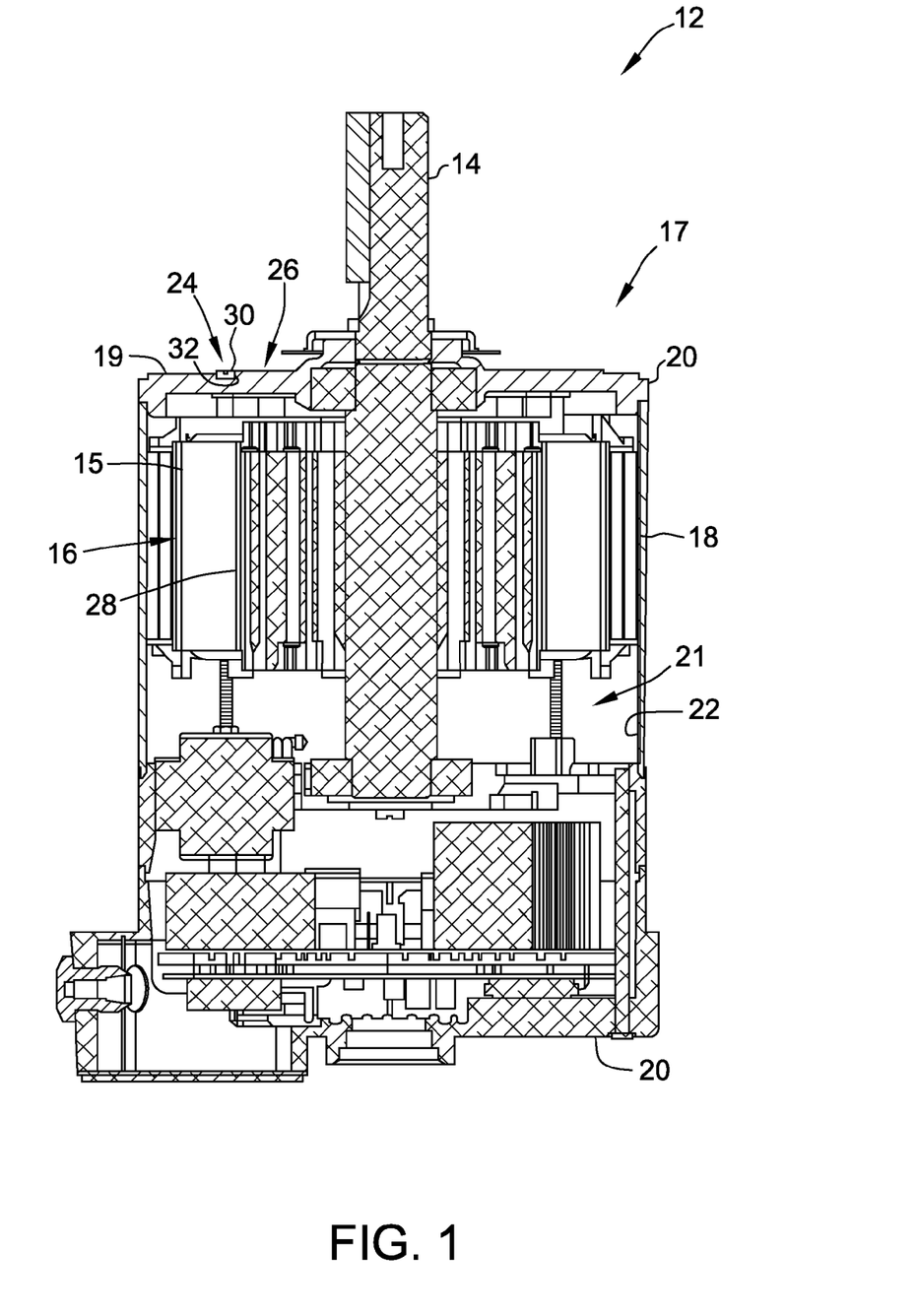
FIG. 1 is a plan view, shown in cross section, of an embodiment of the present invention in the folio of an electric machine.

According to an embodiment of the present invention and referring to Figure. 1, an electric machine 12 is provided. The electric machine 12 may be an electric motor or an electric generator, but hereinafter will be described as an electric motor 12. It should be appreciated that the electric motor may be used to power any mechanism, for example, a pump, a cyclic drive, a compressor, a vehicle, a fan or a blower.

The electric motor 12 typically includes a centrally located motor shaft 14 that rotates relative to the motor 12. Electrical energy applied to coils 15 within the motor 12. The coils 15 initiate relative motion between the shaft 14 and the motor 12 that transfers the power from the coils to the shaft 14.

A stationary assembly 16, also referred to as a stator, includes the stator core and coils 15 or windings positioned around portions of the stator core. It is these coils to which enemy is applied to initiate this relative motion which transfers the power to the shaft. These coils 15 are firmed by winding wire (not shown), typically copper, aluminum or a combination thereof, about a central core to form the winding or coil. An electric current is directed through the coils 15 which induces a magnetic field. It is the magnetic field that initiates this relative motion which transfers the power to the shaft 14.

Typically the motor 12 includes a housing 17. The housing 17 may include a plurality of components and may be made of a suitable durable material, for example a metal, a polymer or a composite. The housing 17 may, as shown, include a cylindrical shell 18 and opposed end caps 20. The shaft 14 extends outwardly from an end 19 of the electric motor 12, typically from one of the end caps 20. The motor 12 may have any suitable size and shape and may be, for example, an induction motor, a permanent-split capacitor (PSC) motor, an electronically commutated motor (ECM) motor, or a switched reluctance motor. The housing 17 may include protrusions, for example fins (not shown), for dissipation of heat. The motor 12 may also include a fan (not shown) positioned within housing 17.

As shown in FIG. 1, the housing 17 of the electric machine 12 defines a cavity 21 in the housing 17. The housing 17 has an internal wall 22 of the housing 17 defining an aperture 24 extending from an exterior 26 of the housing 17 to the cavity 21. The motor 12 also includes the stator 16 secured to the housing 17 and a rotor 28. The rotor 28 is rotatably secured to the housing 17. The machine also includes a component 30 positionable in the aperture.

The portion of the aperture 24 not occupied by the component 30 provides a pathway between the exterior 26 of the housing 17 mid the cavity 21 in the housing 17. It may be desirable to keep motor items contained within the motor and to keep contamination out of the cavity of the housing 17. A device 32, commonly called a seal or sealing member, can be positioned in the pathway to keep motor items contained within the motor and to keep contamination out of the cavity 21 of the housing 17. According to the present invention, the device 32 may be in the form of a sealing member 32.

The sealing member 32 is operably associated with the component 30. The sealing member 32 and the component 30 may be positionable in close proximity to each other and in close proximity to the aperture 24.

As shown in FIG. 1, at least a portion of the sealing member 32 is made of a conformable material and adapted for engagement with the housing. The internal wall 22 of the housing 17 is adapted to radially engage the conformable portion of the sealing member 32. It should be appreciated that the conformable material may be compressible.

Figure 2:
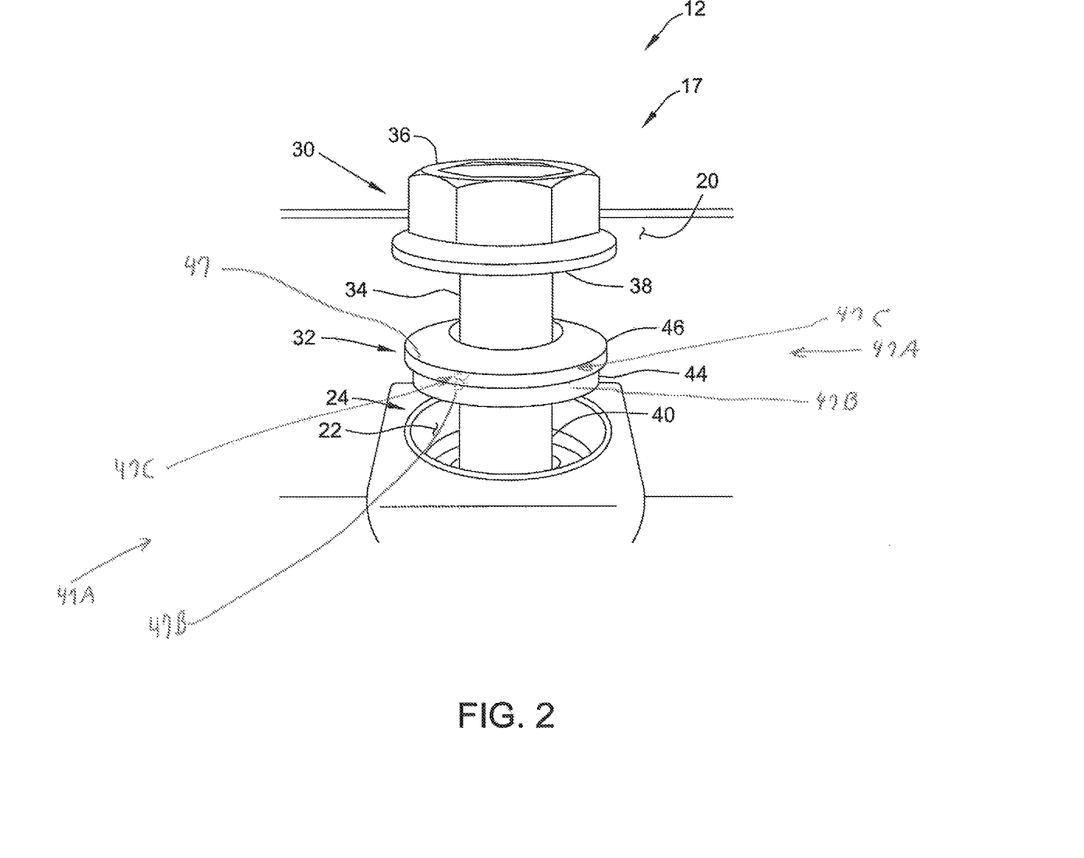
FIG. 2 is a partial exploded perspective view of the electric machine of FIG. 1.

For example and as shown in FIG. 2, the sealing member 32 engages with component 30. The component 30 may be any component that extends through the aperture 24 formed by the internal wall 22 formed in the housing 17. As shown, the aperture is in endcap 20 of the housing 17, but it should be appreciated. that the present invention may be used with any aperture. The component 30 may be a fastener, for example a cap screw as shown. It should be appreciated that the component 30 may be any component capable of assisting in compressing the sealing member 32 to provide the sealing effect of the present invention.

As shown in FIG. 2, the component is shown as a cap screw 30 with a shank 34. A transversely extending portion in the form of a head 36 extends from one end 38 of the shank 34. The shank 34 may include an unthreaded portion 40 that is not threaded and which may be engagable with the sealing member 32. The shank 34 may also include a threaded portion 42 (see FIG. 7) extending from the unthreaded portion 40 in a direction opposed to the head 36. The threaded portion 42 engages with threads on a nut 80 (shown in phantom in FIG. 7) or with other component or components (not shown) of the motor 12. Note that the portion of the shank 34 engagable with the sealing member may be threaded (see FIG. 8).

As shown in FIG. 2, the device 32, commonly called a seal or sealing member, includes a conformable portion 44. It should be appreciated that the conformable portion 44 may be made of a material that is compressible, as well as conformable. While it should be appreciated that the device 32 may be made of a unity conformable material, as shown the sealing member is made from a plurality of components. As shown, the sealing member 32 includes a backing portion 46 and the conformable portion 44. The backing portion 46 and the conformable portion 44 may have any suitable shape and may have the shape of a washer to fit within the aperture 24 and to surround the shank 34 of the cap screw 30. The backing portion 46 and the conformable portion 44 may be unattached or, as shown, attached. Adhesives 47 or mechanical interconnections 47A, for example, protrusions 47B and openings 47C, may be used to secure the portions 44 and 46 together.

Figure 3:
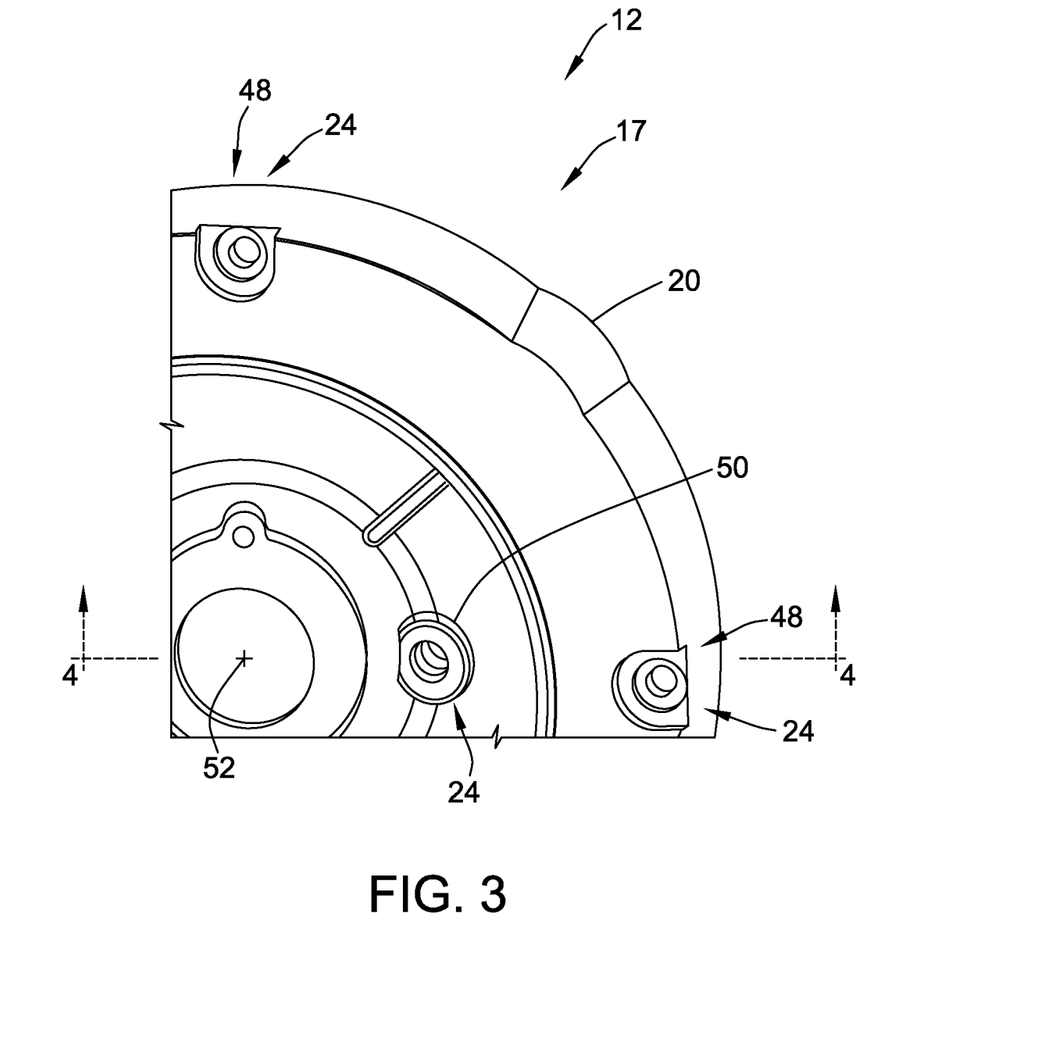
FIG. 3 is a partial top view of the electric machine of FIG. 1.
Figure 4:
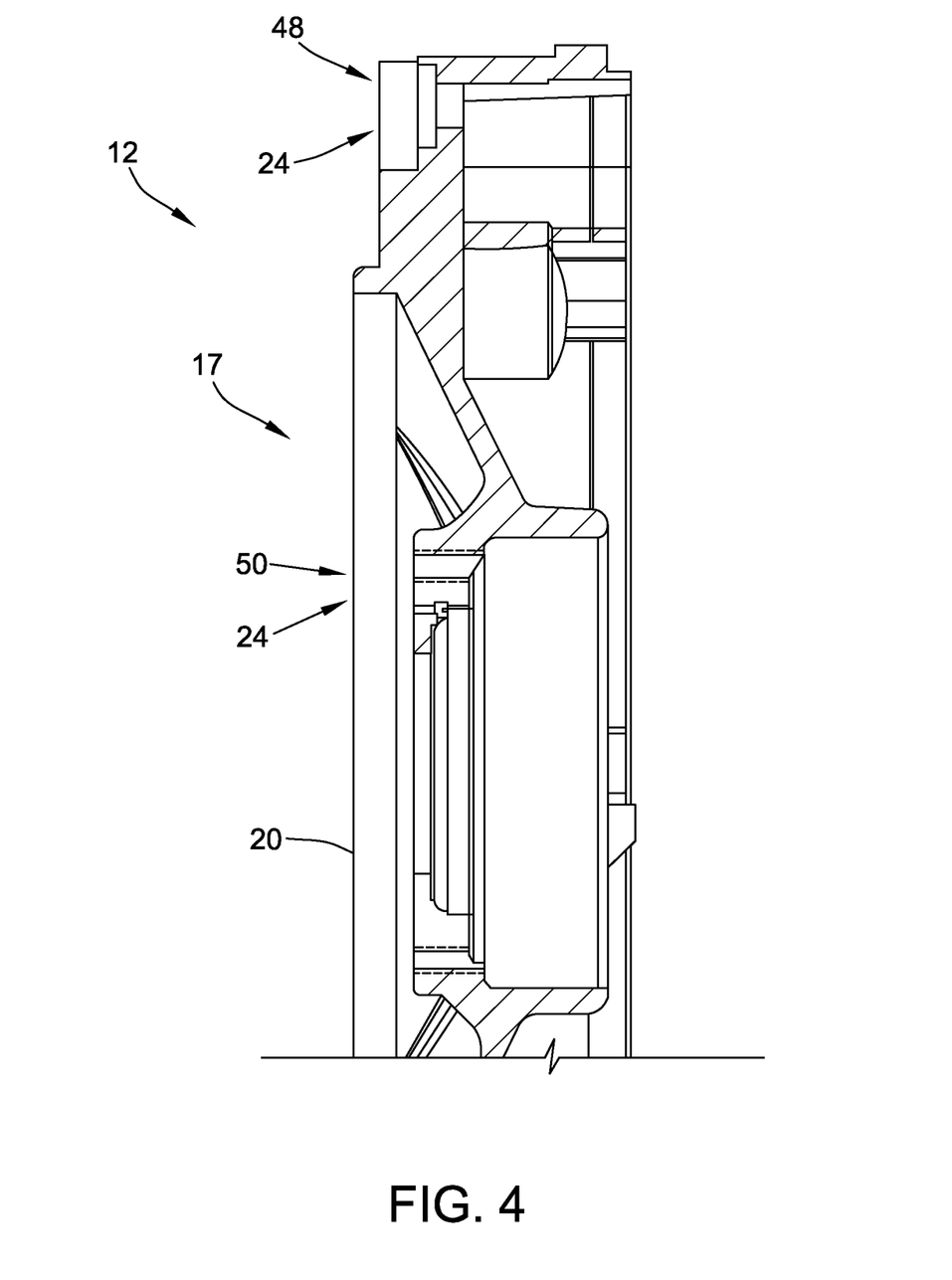
FIG. 4 is a partial cross-sectional plan view of the electric machine of FIG. 3 along the line 4-4 in the direction of the arrows.

While a solitary sealing member may be used in a motor, frequently a plurality of sealing members may be used For example and referring now to FIGS. 3 and 4, four peripheral cap screw openings 48 each having the aperture 24 are used in motor 12. The motor 12, as shown, also utilizes two inner cap screw openings 50 each having the aperture 24. The cap screw openings 48 and 50 may, for simplicity, be equally spaced about rotational centerline 52 of motor shaft 14.

Figure 5:
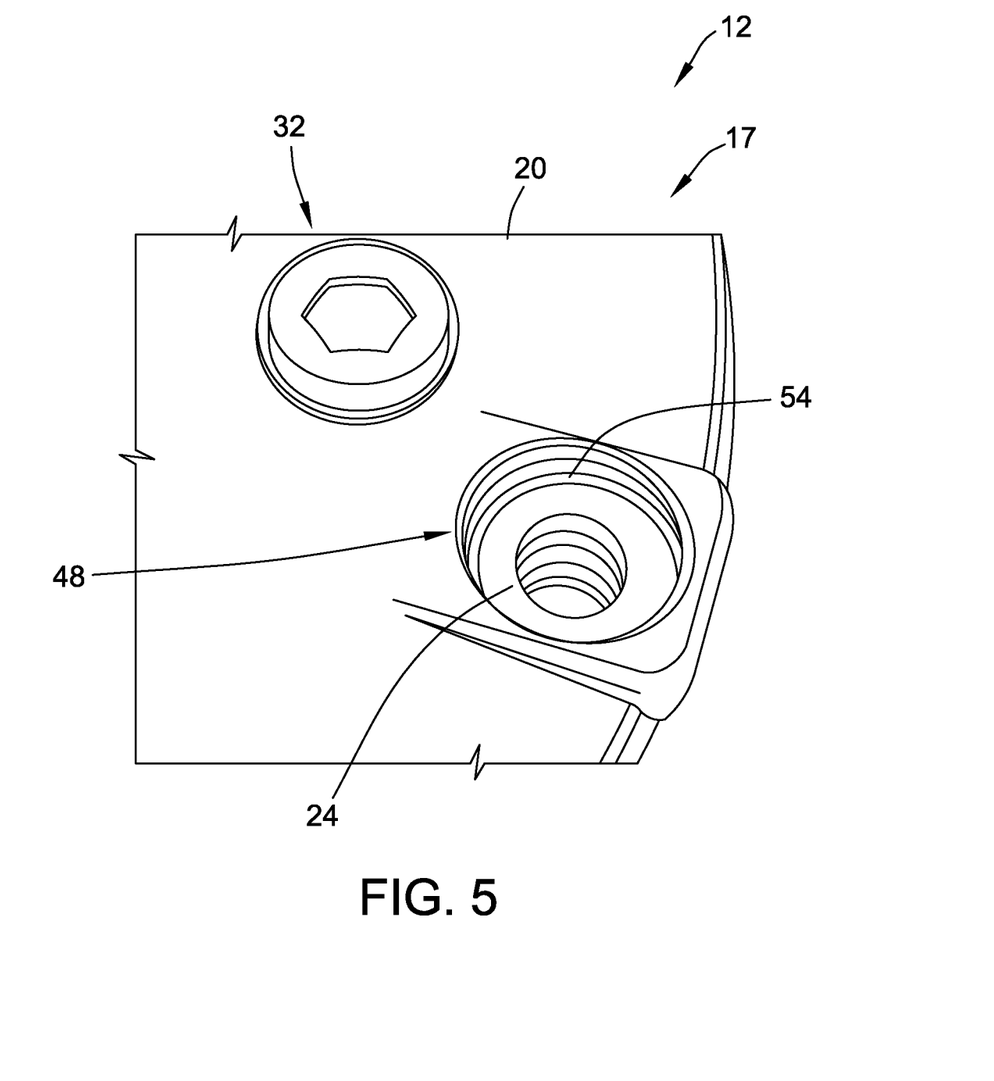
FIG. 5 is another partial top view of the electric machine of FIG. 1.

Referring now to FIG. 5, a typical peripheral cap screw opening 48 is shown. As shown, the opening 48 is formed in endcap 20 of housing 17 of motor 12. The opening 48 includes a counterbore 54 formed in endcap 20 and extending from aperture 24 formed in endcap 20 for receiving the shank 34 of cap screw 30 (see FIG. 2). The counterbore 54 is sized to receive the sealing member 32.

Figure 6:
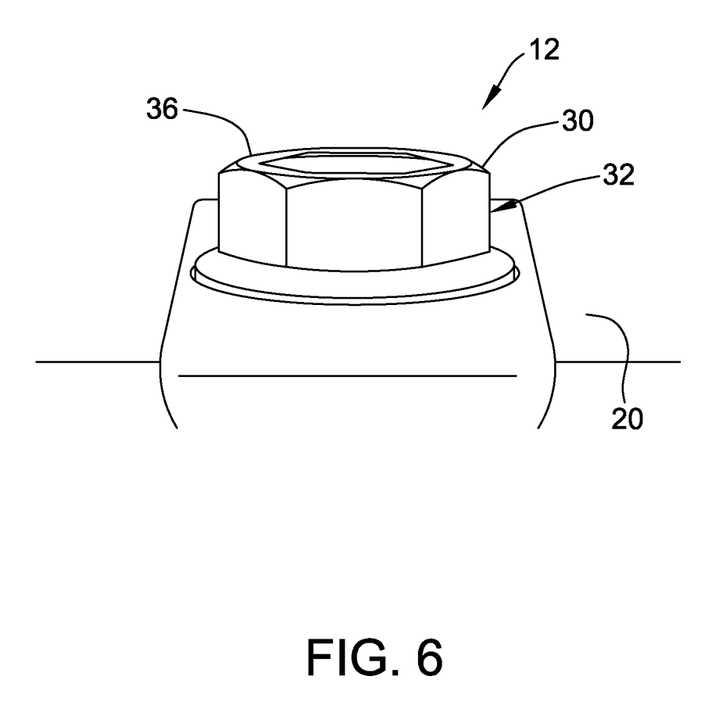
FIG. 6 is another perspective view of the electric machine of FIG. 1.

Referring now to FIG. 6, the cap screw 30 is shown engaged with endcap 20 of housing 17.

Figure 7:
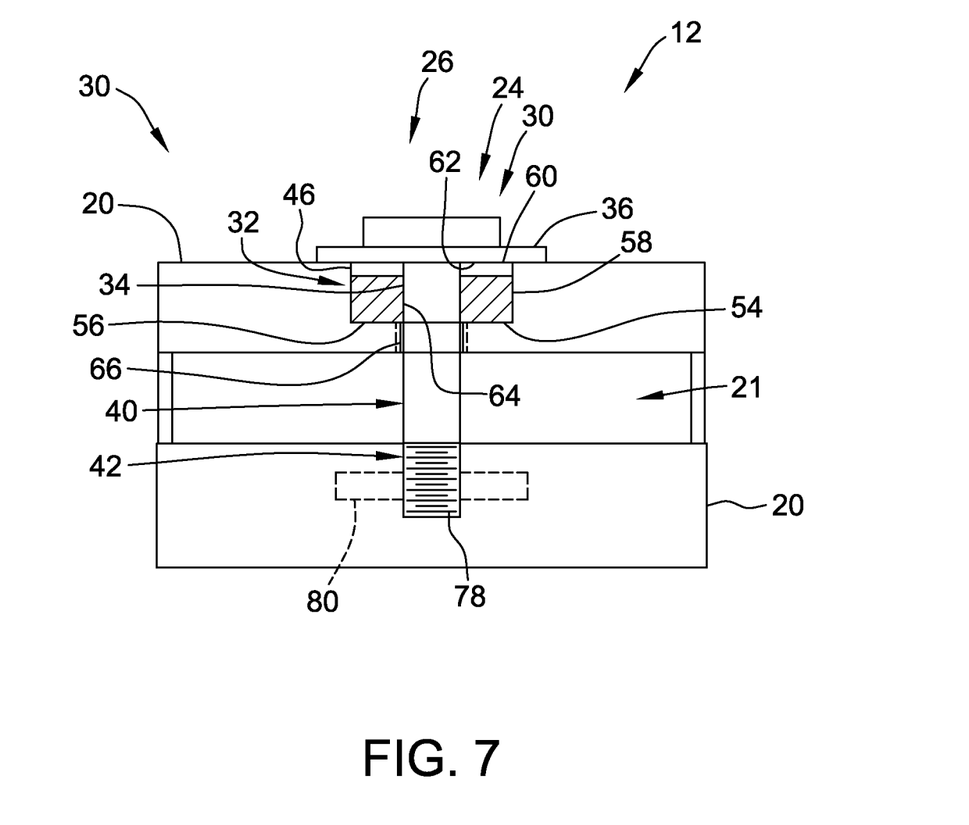
FIG. 7 is a partial plan view of the electric machine of FIG. 1.

Referring now to FIG. 7, a portion of the end cap 20 of the motor 12 is shown in cross section with the sealing member 32 engaged in counterbore 54 of aperture 24 of endcap 20 and around the cap screw 30 to provide sealing to the cavity 21 of the motor 12 from the ingress of contamination from the exterior 26 of motor 12.

As shown in FIG. 7, the conformable portion 44 of the sealing member 32 engages the counterbore 54 of aperture 24 of endcap 20 and the shank 34 of the cap screw 30 to seal the cavity 21 of the motor from the ingress of contamination from the exterior 26 of motor 12.

The cap screw 30 includes a threaded portion 42 that engages threads 78 formed in endcap 20. The cap screw 30 may be used to secure opposed end caps 20 to each other. Alternately, the threaded portion 42 of the cap screw 30 may engages a threaded nut 80 (shown in phantom).

Figure 8:
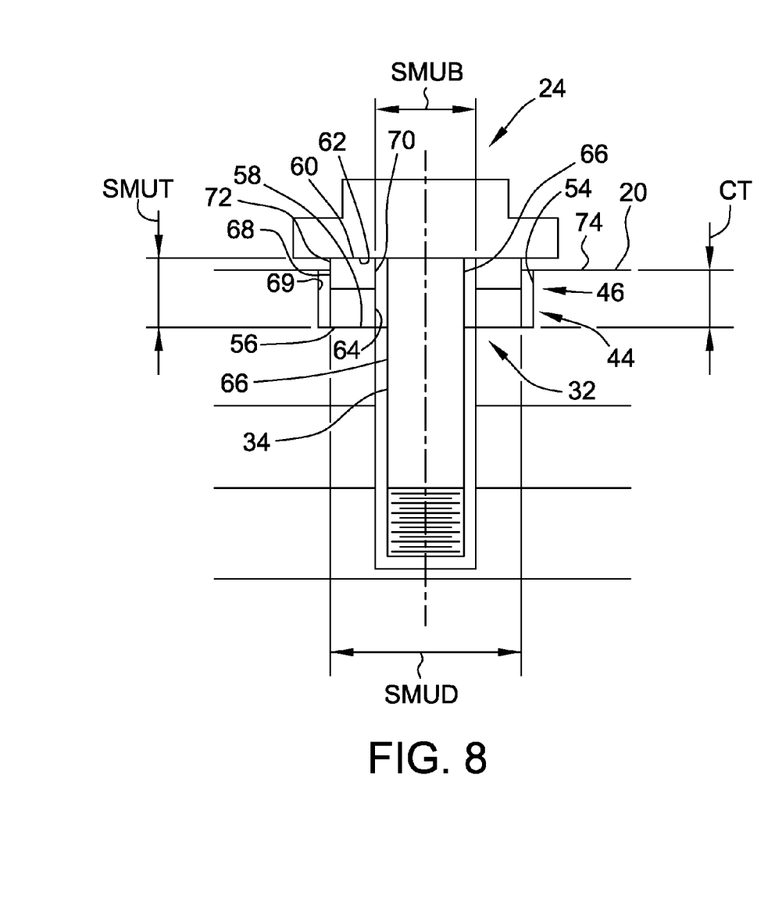
FIG. 8 is a partial cross-sectional plan view of the electric machine of FIG. 1 showing the sealing device of the present invention in an non-conformed position.
Figure 9:
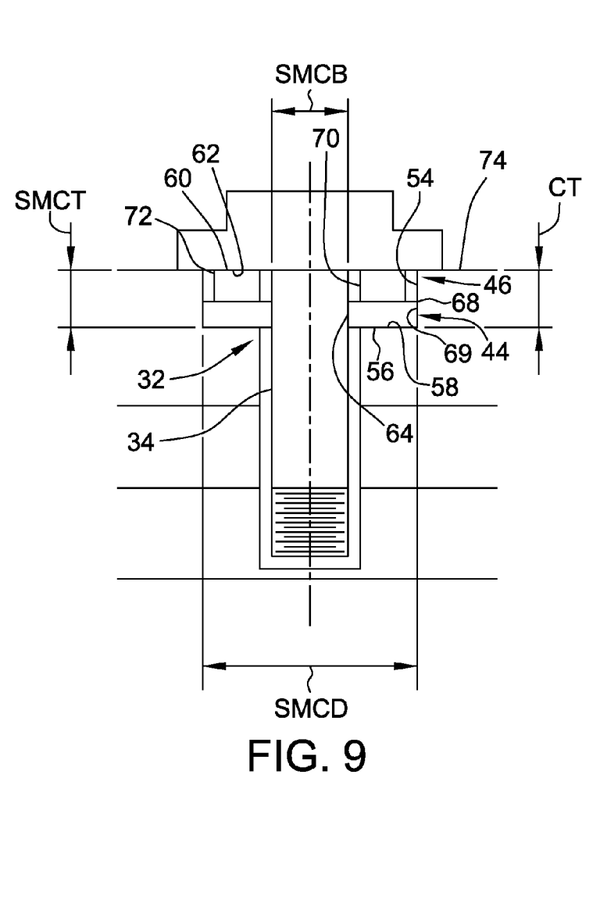
FIG. 9 is a partial cross-sectional plan view of the electric machine of FIG. 1 showing the sealing device of the present invention in a conformed position.

Referring now to FIGS. 8 and 9, the cap screw 30 is shown in FIG. 8 with the conformable portion 44 of the sealing member 32 in an unconformed (which may be uncompressed) condition and the cap screw 30 is shown in FIG. 9 with the conformable portion 44 of the sealing member 32 in a conformed (which may be compressed) condition.

As shown in FIG. 8, outer face 56 of the conformable portion 44 of the sealing member 32 is in contact with the counterbore recess face 58 of the counterbore 54 of aperture 24 of endcap 20. Similarly outer face 60 of the unconformable portion 46 of the sealing member 32 is in contact with inner face 62 of head 36 of cap screw 30.

Bore 64 of the conformable portion 44 of the sealing member 32 is spaced from or in sliding contact with outer diameter 66 of the shank 34 of cap screw 30. Similarly, outer periphery 68 of the conformable portion 44 of the sealing member 32 is spaced from or in sliding contact with the counterbore inner diameter 69 of the counterbore 54 of aperture 24 of endcap 20.

Similarly, bore 70 of the unconformable portion 46 of the sealing member 32 is spaced from or in sliding contact with the outer diameter 66 of the shank 34 of cap screw 30. Similarly, outer periphery 72 of the unconformable portion 46 of the sealing member 32 is spaced from or in sliding contact with the counterbore inner diameter 69 of the counterbore 54 of aperture 24 of endcap 20.

As shown in FIG. 9, outer face 56 of the conformable portion 44 of the sealing member 32 is in conforming (which may be compressing) engagement with the counterbore recess face 58 of the counterbore 54 of aperture 24 of endcap 20. Outer face 60 of the unconformable portion 46 of the sealing member 32 is engaged with inner face 62 of head 36 of cap screw 30.

Bore 64 of the conformable portion 44 of the sealing member 32 is in conforming (which may be compressing) engagement with the outer diameter 66 of the shank 34 of cap screw 30. Similarly, outer periphery 68 of the conformable portion 44 of the sealing member 32 is in conforming (which may be compressing) engagement with the counterbore inner diameter 69 of the counterbore 54 of aperture 24 of endcap 20.

Bore 70 of the unconformable portion 46 of the sealing member 32 is spaced from or in sliding contact with the outer diameter 66 of the shank 34 of cap screw 30. Similarly, outer periphery 72 of the unconformable portion 46 of the sealing member 32 is spaced from or in sliding contact with the counterbore inner diameter 69 of the counterbore 54 of aperture 24 of endcap 20.

As shown in FIGS. 8-9, as the sealing member 32 is conformed (which may be compressed), the conformable portion 44 of the sealing member 32 is conformed and its thickness is reduced. Hence, the thickness of sealing member 32 is reduced and changes from SMUT (as shown in FIG. 8) to SWT (as shown in FIG. 9). Note that the SMCT is substantially the same as the counterbore thickness CT. This is because the counterbore recess face 58 of the counterbore 54 of aperture 24 of endcap 20 and outer surface 74 of the endcap 20 that define the counterbore thickness CT are the same as SMCT when the head 36 of the cap screw 30 is seated against the outer surface 74 of the endcap 20. By providing a counterbore 54 with a depth less than the conformable thickness of the sealing member 32 and greater than the unconformed thickness of the sealing member 32, the conforming (and possible compressing) of the sealing member 32 can be precisely controlled by merely seating the head 36 of the screw 30 against surface 74 of endcap 20.

As shown in FIG. 9, when the thickness of sealing member 32 is reduced to SMCT, the conformable (which may be compressible) material in the conformable portion 44 of the sealing member 32 expands inwardly to cause the bore of the conformable portion 44 of the sealing member 32 to reduce from SMUB to SMCB and expands outwardly to cause the diameter of the conformable portion 44 of the sealing member 32 to enlarge from SMUD to SMCD. This inward expansion toward the shank. 34 of cap screw 30 and this outward expansion toward counterbore 54 of aperture 24 of endcap 20 contribute to the sealing of the aperture 24.

The end caps 20 and the cap screws 30 may be made of any suitable durable material and may be made of for example, a composite, a polymer or a metal and may be made from, for example, a ferrous material or an aluminum alloy. The end caps 20 and the cap screws 30 may be made by any suitable process and may be made by, for example, stamping, casting, extruding, cold heading, etc.

The sealing member 32 may be made of any suitable, durable materials. The conformable portion 44 of the sealing member 32 may be made of conformable material and may be made of compressible material. The conformable portion 44 of the sealing member 32 may be made of a polymer and may be made of a low durometer material. The unconformable portion 46 of the sealing member 32 may be made of any suitable durable material and may be made of for example, a polymer, a metal or a composite.

Figure 10:
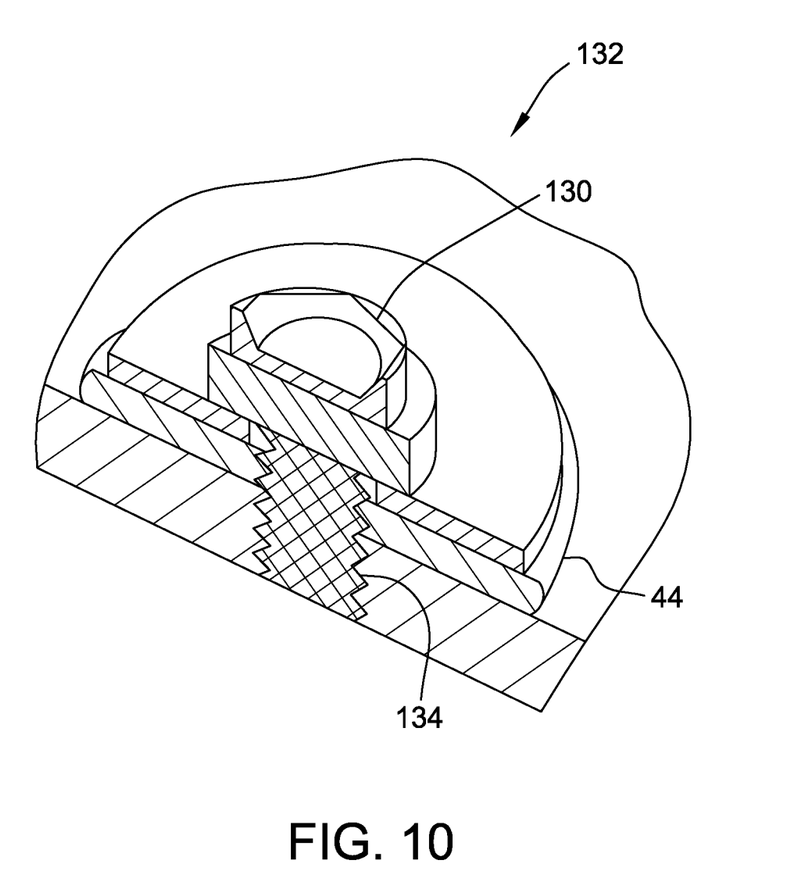
FIG. 10 is a partial perspective view of another embodiment of an electric machine in accordance with the present invention in the faun of an electric machine with a seal for engagement with the threaded portion of a fastener.

Referring now to FIG. 10, another embodiment of the present invention is shown as sealing device 132. The device 132 is similar to device 32 of FIGS. 1-9 except device 132 is adapted for use with a fastener 130 in the form of a cap screw with a shank 134 that, unlike shank 34 of cap screw 30 of the sealing device 32 of FIGS. 1-9, has a shank that is threaded for its entire length. The sealing device 132 has a conformable portion 44 that is sufficiently conformable to seal the threads on shank 134 of cap screw 130.

Figure 11:
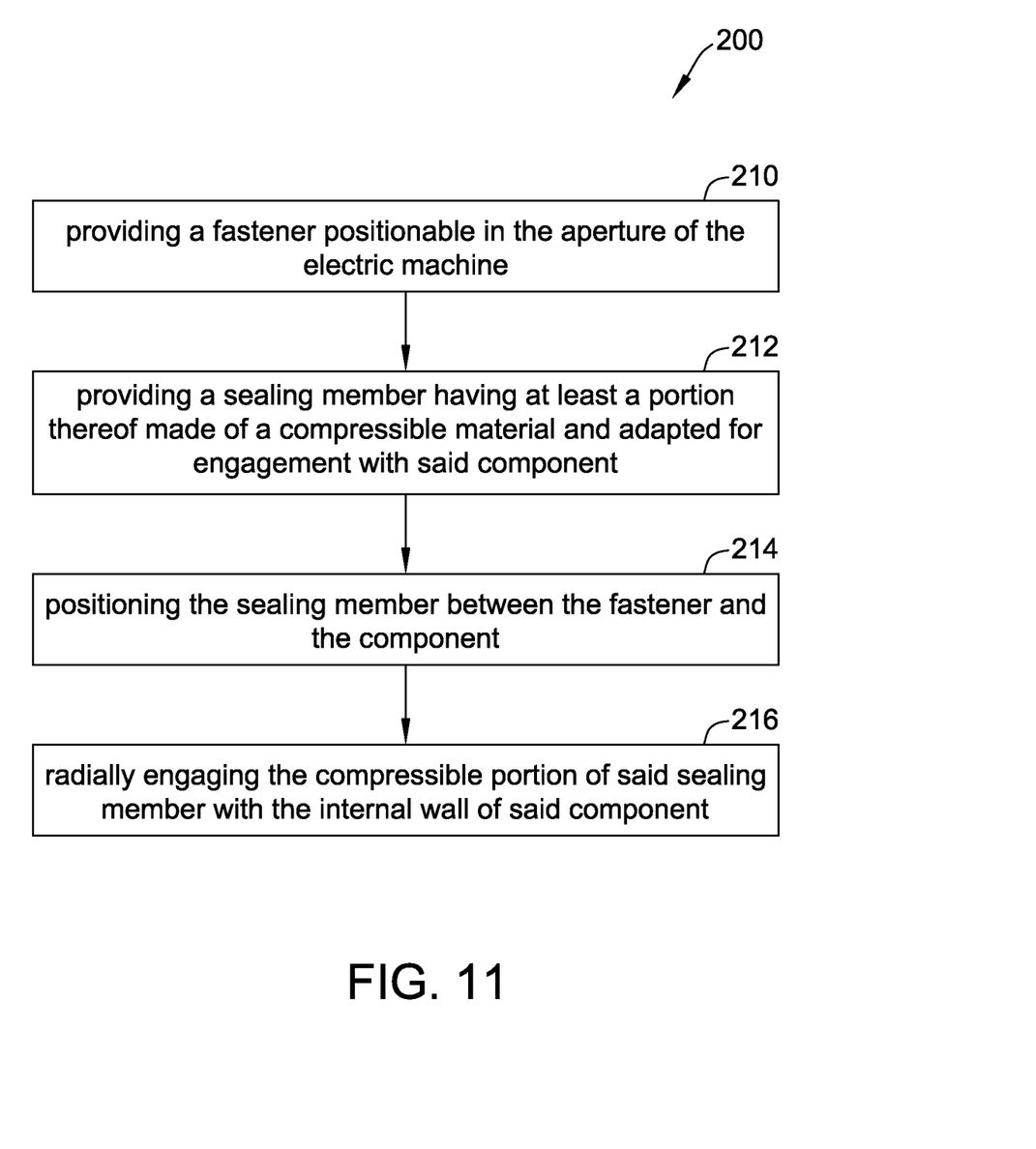
FIG. 11 is a flow chart of another embodiment of the present invention in the form of a method for providing an electric machine.

Referring now to FIG. 11, another embodiment of the present invention is shown as method 200 for sealing an aperture defined by an internal wall Ruined in a component of an electric machine and extending from an external surface thereof to an internal surface thereof is provided. The method includes step 210 of providing a fastener postionable in the aperture of the electric machine and step 212 of providing a sealing member having at least a portion thereof made of a conformable material and adapted for engagement with the component. The method further includes step 214 of positioning the sealing member between the fastener and the component and step 216 of radially engaging the conformable portion of the sealing member with the internal wall of the component.

The method may be provided wherein the providing a fastener step includes providing a fastener with a head and wherein the radially engaging step includes advancing the fastener in an axial direction and compressing the conformable portion of the sealing member in an axial direction.

The method may be provided wherein the providing a sealing member step included providing a sealing member having a washer and a seal. The washer is in juxtaposition with the seal. The providing a fastener step includes providing a fastener with a head. The internal wall formed in the component includes a cylindrical bore and a counterbore. The cylindrical bore is in juxtaposition with the counterbore.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine, comprising:
   a housing, said housing defining a cavity therein, said housing having first internal wall thereof defining an aperture extending from an exterior of said housing to the cavity and a second internal wall thereof defining a shoulder;
   a stator secured to said housing;
   a rotor, rotatably secured to said housing;
   a fastener having a head extending from a first end thereof, the head defining a first surface thereof positioned in the aperture and defining a longitudinal axis thereof; and
   a sealing member circumferentially positioned around the longitudinal axis of said fastener and having a non-conformable portion and a conformable portion thereof made of a conformable material, the conformable portion permanently secured to the non-conformable portion to form a unity piece, the non-conformable portion of said sealing member in engagement with the surface of the head, the conformable portion of the sealing member extending essentially below the non-conformable portion of said sealing member, the non-conformable portion of said sealing member and the shoulder axially compressing the conformable portion of said sealing member therebetween as the non-conformable portion of said sealing member and the shoulder are urged axially toward each other as the fastener is tightened, the axial compressing causing the sealing member to radially expand and to radially engage the fastener and the first internal wall of said housing and no portion of the non-conformable portion extending into the conformable portion.

2. The machine as in claim 1, wherein the first internal wall comprises generally a cylindrical bore.

3. The machine as in claim 1, wherein said sealing member is one of spaced from and in sliding contact with said fastener and wherein said sealing member is one of spaced from and in sliding contact with said housing when said sealing member is not in engagement with the surface of the head.

4. The machine as in claim 1, wherein said sealing member includes at least a portion thereof made of a polymer for engagement with said housing.

5. The machine as in claim 1, wherein said sealing member includes:
   a washer; and
   a seal, said seal permanently secured to said washer.

6. The machine as in claim 1, wherein the conformable portion is permanently secured to the non-conformable portion by a mechanical interconnection in the form of protrusions and openings.

7. The machine as in claim 1, wherein the conformable portion is permanently secured to the non-conformable portion by a mechanical interconnection.

8. The machine as in claim 1, wherein as the non-conformable portion of said sealing member and the shoulder are urged axially toward each other as the fastener is tightened, the conformable portion of said sealing member and the fastener transform from a spaced apart condition to an engaged condition.

9. The machine as in claim 1, wherein as the non-conformable portion of said sealing member and the shoulder are urged axially toward each other as the fastener is tightened, the conformable portion of said sealing member and the first internal wall of the housing transform from a spaced apart condition to an engaged condition.

10. A sealing assembly for use in an electric machine to seal a component defining a cavity therein, said component having a first internal wall there-of defining an aperture extending from an exterior of said component to the cavity and a second internal wall thereof defining a shoulder, said sealing assembly comprising:
   a fastener positioned in the aperture and defining a longitudinal axis thereof; and
   a sealing member circumferentially positioned around the longitudinal axis of said fastener and having at least a conformable portion thereof made of a conformable material and a non-conformable portion, the non-conformable portion of the sealing member and shoulder axial compressing the conformable portion of the sealing member between the shoulder of said component and said fastener as the non-conformable portion of said sealing member and the shoulder of said housing are urged axially toward each other as the fastener is tightened, the axial compressing causing the sealing member to radially expand and to radially engage the fastener and the first internal wall of said component, the conformable portion permanently secured to the non-conformable portion to form a unitary piece, the non-conformable portion of said sealing member in engagement with said fastener, the conformable portion of the sealing member extending essentially below the non-conformable portion of said sealing member and no portion of the non-conformable portion extending into the conformable portion.

11. The assembly as in claim 10,
wherein the first internal wall comprises generally a cylindrical bore.

12. The assembly as in claim 10, wherein the conformable portion is permanently secured to the non-conformable portion by adhesives.

13. The assembly as in claim 10, wherein said sealing member includes at least a portion thereof made of a polymer for engagement with said component.

14. The assembly as in claim 10, wherein said sealing member includes:
a washer; and
a seal, said washer in juxtaposition with said seal.

15. The assembly as in claim 10:
wherein said fastener has a head and a shank extending from said head; and
wherein said sealing member includes a washer and a seal, said washer in juxtaposition with said seal.

16. The sealing assembly as in claim 10, wherein as the non-conformable portion of said sealing member and the shoulder are urged axially toward each other as the fastener is tightened, the conformable portion of said sealing member and the fastener transform from a spaced apart condition to an engaged condition.

17. The sealing assembly as in claim 10, wherein as the non-conformable portion of said sealing member and the shoulder are urged axially toward each other as the fastener is tightened, the conformable portion of said sealing member and the first internal wall of the housing transform from a spaced apart condition to an engaged condition.

18. A method for sealing an aperture defined by first internal wall formed in a housing of an electric machine and extending from an external surface thereof to an internal surface thereof and defined by a second internal wall thereof defining a shoulder, the method comprising the steps of:
providing a fastener defining a longitudinal axis and positionable in the aperture of the electric machine;
providing a seal made of a conformable material;
providing a backing member made of a non-conformable material;
permanently joining the seal to the backing member to form a sealing member such that no portion of the non-conformable portion extends into the conformable portion;
positioning the sealing member between the fastener and the housing;
axially compressing the conformable material of the seal of the sealing member between the shoulder of the housing and the fastener; and
radially expanding the conformable material of the seal of said sealing member into engagement with the fastener and the first internal wall of the housing.

19. The method as in claim 18:
wherein the providing a fastener step comprises providing a fastener with a head; and
wherein the radially expanding step comprises advancing the fastener in an axial direction and compressing the conformable portion of said sealing member in an axial direction.

20. The method as in claim 18:
wherein the providing a sealing member step comprised providing a sealing member having a washer and a seal, the washer in juxtaposition with the seal;
wherein the providing a fastener step comprises providing a fastener with a head; and
wherein the first internal wall formed in the component comprises a cylindrical bore.

\* \* \* \* \*